United States Patent
Firl et al.

(10) Patent No.: US 9,207,088 B2
(45) Date of Patent: Dec. 8, 2015

(54) METHOD FOR OPERATING A MOTOR VEHICLE AND MOTOR VEHICLE

(71) Applicant: GM GLOBAL TECHNOLOGY OPERATIONS LLC, Detroit, MI (US)

(72) Inventors: Jonas Firl, Wiesbaden (DE); Hagen Stuebing, Buedingen (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/335,623

(22) Filed: Jul. 18, 2014

(65) Prior Publication Data

US 2015/0025795 A1    Jan. 22, 2015

(30) Foreign Application Priority Data

Jul. 18, 2013  (DE) .......................... 10 2013 011 969

(51) Int. Cl.
*G01C 21/32* (2006.01)
*G01C 21/36* (2006.01)

(52) U.S. Cl.
CPC ............ *G01C 21/32* (2013.01); *G01C 21/3602* (2013.01)

(58) Field of Classification Search
CPC ....................................................... G01C 21/32
USPC ........................................ 701/461, 408, 409
See application file for complete search history.

(56) References Cited

U.S. PATENT DOCUMENTS

| | | | |
|---|---|---|---|
| 6,438,491 B1 | 8/2002 | Farmer | |
| 2008/0243378 A1 * | 10/2008 | Zavoli | 701/209 |
| 2009/0228204 A1 | 9/2009 | Zavoli et al. | |
| 2012/0163656 A1 | 6/2012 | Wang et al. | |

FOREIGN PATENT DOCUMENTS

| | | |
|---|---|---|
| DE | 102004010197 A1 | 9/2005 |
| DE | 102011119762 A1 | 6/2012 |
| DE | 102011084993 A1 | 4/2013 |

* cited by examiner

*Primary Examiner* — Mary Cheung
*Assistant Examiner* — Brian P Sweeney
(74) *Attorney, Agent, or Firm* — Ingrassia Fisher & Lorenz PC

(57) ABSTRACT

A method for operating a motor vehicle is disclosed which includes determining of a current position of the motor vehicle and accessing a data of map data stored in at least one vehicle-external storage device. The accessed data set contains map data of surroundings of the determined current position of the motor vehicle. The method further include, classifying objects contained in the map data according to stationary objects and moveable objects, and transmitting data contained in the map data of the accessed data set regarding objects classified stationary to at least one interface of the motor vehicle.

14 Claims, 5 Drawing Sheets

METHOD FOR OPERATING A MOTOR VEHICLE AND MOTOR VEHICLE

CROSS REFERENCE TO RELATED APPLICATION

This application claims priority to German Patent Application No. 102013011969.3 filed Jul. 18, 2013, which is incorporated herein by reference in its entirety.

TECHNICAL FIELD

The technical field relates to a method for operating a motor vehicle, a motor vehicle, a computer program product and a computer-readable medium.

BACKGROUND

DE 10 2011 119 762 A1 describes a conventional position determining system that is suitable for a motor vehicle and a corresponding method. The system includes a digital map, in which data regarding specific local features is listed according to location, at least one surroundings detection device for detecting the specific local features in the surroundings of the vehicle and a locating module, which is coupled to the digital map, and the surroundings detection device. The locating module includes a processing unit for comparing the detected data and the data listed in the digital map regarding the specific local features and for locating the vehicle position with the help of the specific local features listed in the digital map. Furthermore, the system includes an inertial measuring unit of the vehicle for vehicle movement data, which is coupled to the locating module, the processing unit of which is configured to determine the vehicle position with the help of the vehicle movement data based on the position located with the help of the specific local features.

SUMMARY

An object of an embodiment of the present disclosure is to state a method for operating a motor vehicle, a motor vehicle, a computer program product and a computer-readable medium, which make possible further improved surroundings determination for the motor vehicle.

According to an aspect of the present disclosure, a method for operating a motor vehicle is disclosed. A current position of the motor vehicle is determiner with the help of a position determining device arranged in the motor vehicle. In addition, a data set of map data stored in at least one vehicle-external storage device is access by a communication device arranged in the motor vehicle in such a manner that the accessed data set contains map data of at least a part region of surroundings containing the determined current position of the motor vehicle. Furthermore, objects contained in the map data of the accessed data set are classified according to stationary objects and moveable objects with the help of a classification device arranged in the motor vehicle. In addition to this, data contained in the map data of the accessed data set regarding objects classified stationary to at least one interface of the motor vehicle is transmitted.

A stationary object here and in the following is defined as an object that is stationary or fixed with respect to the ground, i.e. the object is immovable. A moveable object is defined as an object whose position is variable with respect to the ground.

The method according to the mentioned embodiment makes possible a further improved surroundings determination for the motor vehicle. This takes place in particular by accessing a data set containing map data of at least one part region of the current surroundings of the motor vehicle from at least one vehicle-external storage unit, classifying of objects contained in the map data of the accessed data set according to stationary objects and moveable objects and transmitting data contained in the map data of the accessed data set regarding objects classified as stationary to at least one interface of the motor vehicle. This is based on the consideration that such map data stored in a vehicle-external storage device typically contains high-resolution data, which can be utilized for the surroundings determination of the motor vehicle. By classifying the objects contained in the map data of the accessed data set according to stationary objects and moveable objects and transmitting the data contained in the map data regarding objects classified as stationary objects to the at least one interface of the motor vehicle, the accuracy of the surroundings determination can be improved in an advantageous manner since the latter can thereby take place additionally or alternatively to a surroundings determination by a separate vehicle sensor system based on the data of the objects classified as a stationary object, as is explained in more detail in the following.

In an embodiment of the method, the map data of the accessed data set contains image data of images taken with at least one optical camera. In the mentioned embodiment, classifying the objects contained in the data set accessed in the map data includes image evaluation of the image data by an image evaluation unit arranged in the motor vehicle with a sample detection method. This is based on the consideration that digital map data increasingly contains image data, for example images of streets or buildings, which were taken in the region of towns. Such image data is provided for example by the service Google Street View and can be accessed with the help of the communication device arranged in the motor vehicle. By evaluating such high-resolution camera data, the surroundings determination for the motor vehicle can be advantageously further improved.

In addition, a probable travel route of the motor vehicle, i.e. a probable further course of travel of the motor vehicle, is preferably determined. Accessing the data set in this case takes place in that the accessed data set contains map data of at least one part region of the determined probable travel route of the motor vehicle, i.e. map data of at least one part region of the determined probable further course of travel of the motor vehicle. As a result, a data set can be accessed whose map data contains a travel route of the motor vehicle located ahead to as accurate as possible a degree. For example, data for a relevant time horizon of the at least one vehicle-external storage device is loaded or accessed.

The probable travel route of the motor vehicle is determined for example based on data determined by a navigation system. Additionally or alternatively, the probable travel route or the probable further course of travel of the motor vehicle is deduced from data acquired by at least one sensor of the motor vehicle. For example, the probable travel route or the probable course of the motor vehicle can be deduced based on data determined by a steering angle sensor or based on a so-called electronic horizon, which is also called eHorizon.

In a further embodiment of the method it is determined in addition if the data contained in the map data of the accessed data set regarding objects classified as stationary, contains position data of at least one object of the stationary objects. In the mentioned embodiment, in the case that it is determined that the data contains position data regarding an object of the stationary objects, determination of the data contained in the map data of the accessed data set includes transmitting the position data of the at least one object of the stationary objects. As a result, such position data of stationary objects contained in the map data can be advantageously used for the surroundings determination of the motor vehicle.

For example, a current position of the at least one object relative to the motor vehicle is determined based on the determined current position of the motor vehicle and the position data of the at least one object.

In addition, the motor vehicle can include at least one sensor, wherein the at least one sensor is designed for detecting objects within a predetermined detection range. Here, based on data determined by the at least one sensor, a current position of objects detected by the at least one sensor can be additionally determined relative to the motor vehicle.

In addition, the current positions determined based on the data determined by the at least one sensor of the objects detected with the help of the at least one sensor is compared with the current positions of the objects classified as stationary determined based on the position data contained in the map data of the accessed data set. Thus, the position of an object detected with the help of the at least one sensor can be determined to as accurate a degree as possible in that a combination of the determined position values or a mutual validation of the plausibility of the determined current positions of the respective objects takes place. Furthermore, a sensing range of the at least one sensor that is restricted, for example, based on current surroundings conditions can be deduced in the case that the determined current position of an object classified as a stationary object is located within the predetermined detection range, but the object is not detected by the at least one sensor.

In a further embodiment of the method, transmitting of data contained in the map data of the accessed data set regarding objects classified moveable to the at least one interface of the motor vehicle is omitted. Such moveable objects contained in the map data of the accessed data set, for example motor vehicles, which are contained in the image data of the accessed data set, are typically, at the time at which the vehicle is located in the surroundings depicted in the map data, no longer located in said surroundings and are therefore not utilized for the surroundings determination of the motor vehicle.

Transmitting the data regarding the objects classified as stationary objects contained in the map data of the accessed data set preferably includes transmitting the data to at least one driver assistance system of the motor vehicle. As a result, operation of the at least one driver assistance system can be adapted to the respective surroundings situation to a further improved degree. Here, the driver assistance system is selected for example from the group consisting of a traffic sign detection system, a lane-keeping assistant and an intersection assistant.

A further aspect of the present disclosure relates to a motor vehicle including a position determining device, which is designed for determining a current position of the motor vehicle. In addition, the motor vehicle includes a communication device, which is designed for accessing a data set of map data stored in at least one vehicle-external storage device in such a manner that the accessed data set contains map data of at least one part region of surroundings containing the determined current position of the motor vehicle. Furthermore, the motor vehicle includes a classification device, which is designed for classifying objects contained in the map data of the accessed data set according to stationary objects and moveable objects. In addition to this, the motor vehicle includes a transmission device, which is designed for transmitting data contained in the map data of the accessed data set regarding objects classified stationary to at least one interface of the motor vehicle.

The motor vehicle according to the mentioned embodiment includes the advantages already mentioned in connection with the corresponding methods, which are not mentioned again at this point to avoid repetitions. The motor vehicle is for example a passenger car or a utility vehicle.

The at least one communication device preferably contains a mobile radio communication device. The mobile radio communication device corresponds for example to a UMTS mobile radio standard or an LTE mobile radio standard. Such mobile radio communication devices advantageously make possible transferring large quantity of data to the motor vehicle in real time.

In addition, the motor vehicle preferably includes an image evaluation unit, which is designed for classifying the objects contained in the map data of the accessed data set by image evaluation of image data contained in the map data of the accessed data set.

In a further embodiment, the transmission device is designed for transmitting the data contained in the map data of the accessed data set regarding the objects classified stationary to at least one driver assistance system of the motor vehicle. The driver assistance system is selected for example from the group consisting of a traffic sign detection system, a lane-keeping assistant and an intersection assistant.

The position determining device is preferably part of a satellite-supported navigation system in particular of the motor vehicle and can for example be designed as a GPS-supported system, in particular as a DGPS-supported (DGPS, differential GPS) system.

A further aspect of the present disclosure relates to a computer program product which, when it is executed on a computer unit of a motor vehicle, instructs the computer unit to carry out the following steps. The computer unit is instructed for determining a current position of the motor vehicle by a position determining device arranged in the motor vehicle. In addition, the computer unit is instructed for accessing a data set of map data stored in at least one vehicle-external storage device by a communication device arranged in the motor vehicle in such a manner that the accessed data set contains map data of at least one part region of surroundings containing the determined current position of the motor vehicle. In addition, the computer unit is instructed to classify objects contained in the map data of the accessed data set according to stationary objects and moveable objects by a classification device arranged in the motor vehicle. Furthermore, the computer unit is instructed to transmit data contained in the map data of the accessed data set regarding objects classified stationary to at least one interface of the motor vehicle.

In addition to this, a further aspect of the present disclosure relates to a computer-readable medium on which a computer program product according to the mentioned embodiment is stored.

The computer program product and the computer-readable medium according to the mentioned embodiments include the advantages already mentioned in connection with the corresponding method, which are not mentioned again at this point to avoid repetitions.

Furthermore, a further aspect of the present disclosure relates to a device for operating a motor vehicle. The device includes means for determining a current position of the motor vehicle by a position determining device arranged in the motor vehicle. In addition, the device includes means for accessing a data set of map data stored in at least one vehicle-external storage device by a communication device arranged in the motor vehicle in such a manner that the accessed data set contains map data of at least one part region of surroundings containing the determining current position of the motor vehicle. Furthermore, the device includes means for classifying objects contained in the map data of the accessed data set according to stationary objects and moveable objects by a classification device arranged in the motor vehicle. In addition to this, the device includes means for transmitting data contained in the map data of the accessed data set regarding objects classified stationary to at least one interface of the motor vehicle by a transmitter or transceiver. The abovementioned device for operating a motor vehicle, further improves surroundings determination for the motor vehicle as already explained.

The map data of the accessed data set can contains image data of images taken at least one optical camera. Classifying the objects contained in the map data of the accessed data set here includes image evaluation of the image data by an image evaluation unit arranged in the motor vehicle. Through the evaluation of such camera data the surroundings determination for the motor vehicle can be advantageously further improved.

The device for operating a motor vehicle can additionally include means for determining a probable travel route of the motor vehicle. Accessing the data set here is carried out in such a manner that the accessed data set contains map data of at least one part range of the determined probable travel route of the motor vehicle. As a result, a data set can be accessed the map data of which contains, to as accurate as possible a degree, a travel route of the motor vehicle located ahead.

In a further embodiment, the device for operating a motor vehicle additionally includes means for determining if the data contained in the map data of the accessed data set regarding objects classified stationary contains position data of at least one object of the objects classified stationary. In the mentioned embodiment in the case where it is determined that the data contains position data of at least one object of the objects classified as stationary objects includes transmitting the data contained in the map data of the accessed data set, transmitting the position data of the at least one object of the stationary objects. As a result, such position data of stationary objects contained in the map data can be advantageously used for the surroundings determination of the motor vehicle.

For example, a current position of the at least one object relative to the motor vehicle is determined based on the determined current position of the motor vehicle and the position data of the at least one object.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
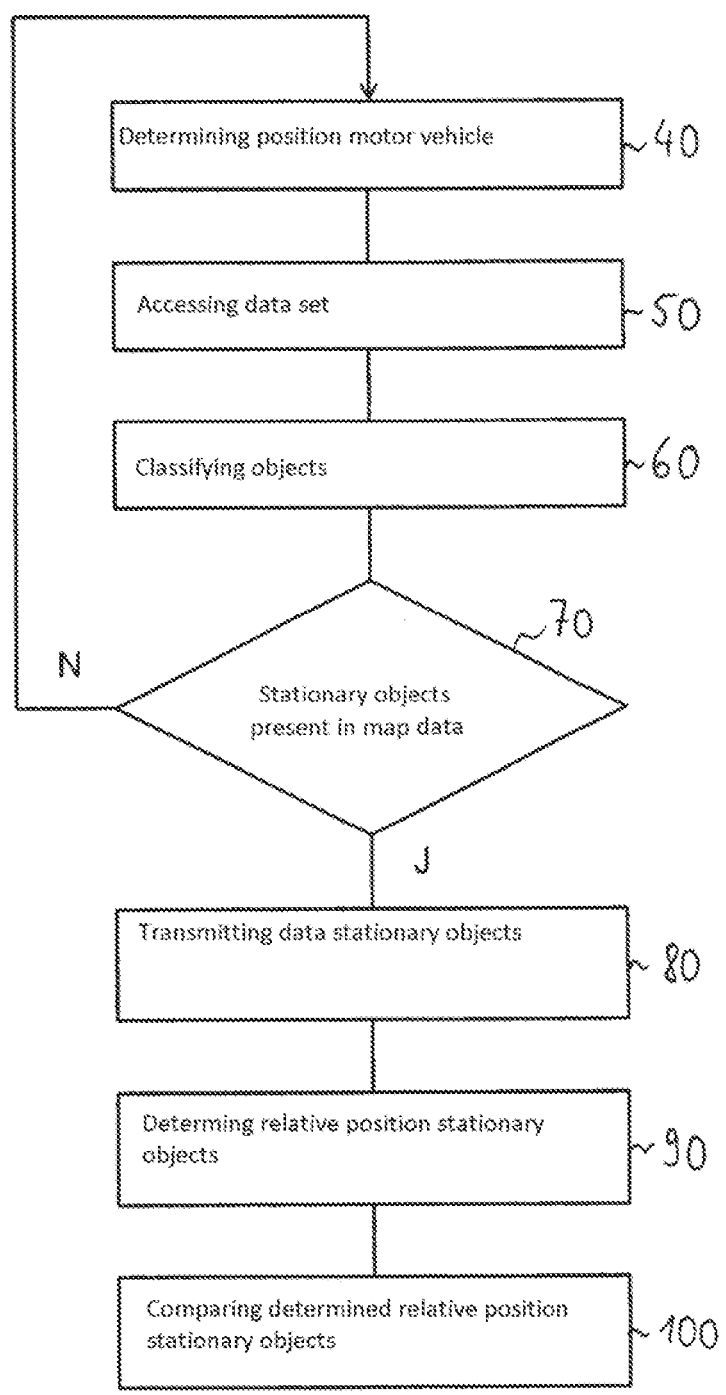
FIG. 1 shows a flow diagram of a method for operating a motor vehicle according to an embodiment of the present disclosure.

FIG. 1 shows a flow diagram of a method for operating a motor vehicle according to an embodiment of the present disclosure. The motor vehicle is for example a passenger car or a utility vehicle.

In a step 40, determining of a current position of the motor vehicle by a position determining device arranged in the motor vehicle takes place. The position determining device is for example part of a navigation system of the motor vehicle or of a mobile phone arranged in the motor vehicle, for example a smart phone. Furthermore, a probable travel route or a probable further course of travel of the motor vehicle can be determined in the step 40. Determining the probable travel route or the probable further course of travel of the motor vehicle here can take place based on data determined by the navigation system and/or based on data determined by at least one sensor of the motor vehicle, for example based on images taken by at least one optical camera of the motor vehicle.

In a step 50, accessing a data set of map data stored in at least one vehicle-external storage device by a communication device arranged in the motor vehicle takes place in such a manner that the accessed data set contains map data of at least one part region of surroundings containing the determined current position of the motor vehicle. The communication device to this end is preferably designed as a mobile radio communication device, which can be part of the motor vehicle or of a mobile telephone arranged in the motor vehicle, for example a smart phone. In the case that a probable travel route or a probable further course of travel of the motor vehicle was determined in the step 40, accessing the data set preferably takes place in such a manner that the accessed data set contains map data of at least one part region of the determined probable travel route of the motor vehicle. For example, a data set with map data is accessed, which contains the probable travel route of the motor vehicle for the following two minutes.

In a step 60, classifying of objects contained in the map data of the accessed data set according to stationary objects and moveable objects takes place by a classification device arranged in the motor vehicle. The classification device is part of the motor vehicle or for example part of a mobile telephone arranged in the motor vehicle. In the case that the map data of the accessed data set contains image data of images taken by at least one optical camera, the classifying of the objects contained in the map data of the accessed data set preferably includes image evaluation of the image data by an image evaluation unit arranged in the motor vehicle, for example by a sample detection method.

Furthermore, these stationary objects can be additionally classified according to their relevance to the surroundings determination in the step 60 in the case that the objects contained in the map data of the accessed data set contains stationary objects. In particular, the respective type of the stationary objects can be determined in more detail, for example if the objects are traffic signs, lane markings or light signaling systems, in particular traffic light systems. In addition, the number of the lanes of a road contained in the map data of the accessed data set can be determined. In a step 70 it is determined if the objects contained in the map data of the accessed data set contains objects, which were classified stationary in the step 60.

In the case that it is determined that the map data of the accessed data set do not contains any stationary objects, the steps 40, 50, 60 and 70 are carried out repeatedly. If by contrast it is determined that the map data of the accessed data set contains at least one object classified stationary, transmitting of data contained in the map data of the accessed data set regarding objects classified stationary to at least one interface of the motor vehicle takes place. For example, the data is transmitted to at least one driver assistance system of the motor vehicle. By contrast, transmitting of data contained in the map data of the accessed data set regarding objects classified moveable to the at least one interface is omitted.

Furthermore, it can be determined in the step 80 if the data contained in the map data of the accessed data set regarding objects classified stationary contains position data of at least one object of the objects classified stationary. In the case that it is determined in the process that the data contains position data of at least one object of the objects classified stationary, transmitting the data contained in the map data of the accessed data set includes in the step 80 transmitting the position data of the at least one object of the objects classified stationary.

In addition, in the shown embodiment, a current position of the at least one object relative to the motor vehicle is determined in a step 90 based on the current position of the motor vehicle determined in the step 40 and the position data of the at least one object classified stationary transmitted in the step 80, if such is available.

Furthermore the relative position of the at least one object classified stationary determined in such a manner is compared in a step 100 with a current position of this object relative to the motor vehicle, which was determined based on data determined by at least one sensor of the motor vehicle. To this end, the objects detected by the at least one sensor of the motor vehicle are preferably classified according to stationary objects and moved objects and the positions of objects classified stationary utilized for the comparison. This makes possible a further improvement of the efficiency of the surround sensor system of the motor vehicle with respect to object detection and classification. The at least one sensor of the motor vehicle in this case is designed for detecting objects within a predetermined detection range and for example selected from the group consisting of an electromagnetic sensor, in particular a radar sensor or a lidar sensor, an acoustic sensor, in particular an ultrasound sensor, and an optical camera.

The described embodiments provide an improvement of the efficiency of the surround sensor system with respect to object detection and classification is thus made possible, as already explained. This is based on the consideration that vehicles to an increased degree are being equipped with mobile communication devices, for example with mobile radio communication devices according to the mobile radio standard LTE, by which live streaming of large data quantities is made possible. In particular the freely available service Google Street View makes available high-resolution camera data, wherein this information according to the shown embodiment can be used for different driver assistance systems. The motor vehicle to this end for example passes its GPS information on to the corresponding Google database. Street view data is subsequently loaded from the database corresponding to the position information. In the process, data for a relevant time horizon is typically loaded. This data is transferred in the vehicle for example to an image processing algorithm, which takes out or filters out all dynamic subscribers in the data and detects and classifies relevant static objects, by which the relevant position regarding one's own position, i.e. regarding the position of the motor vehicle is determined. This information is processed for different objects and interpreted, for example traffic signs, lane markings and lane quantity, traffic lights and similar.

This advantageously makes possible taking into account static objects on a larger horizon, for example of houses, bus stops and similar. In addition, an improvement of the efficiency of the vehicle sensor system is made possible by a comparison with processed street view data. Because of this, a better detection and classification efficiency can be achieved.

Figure 2A:
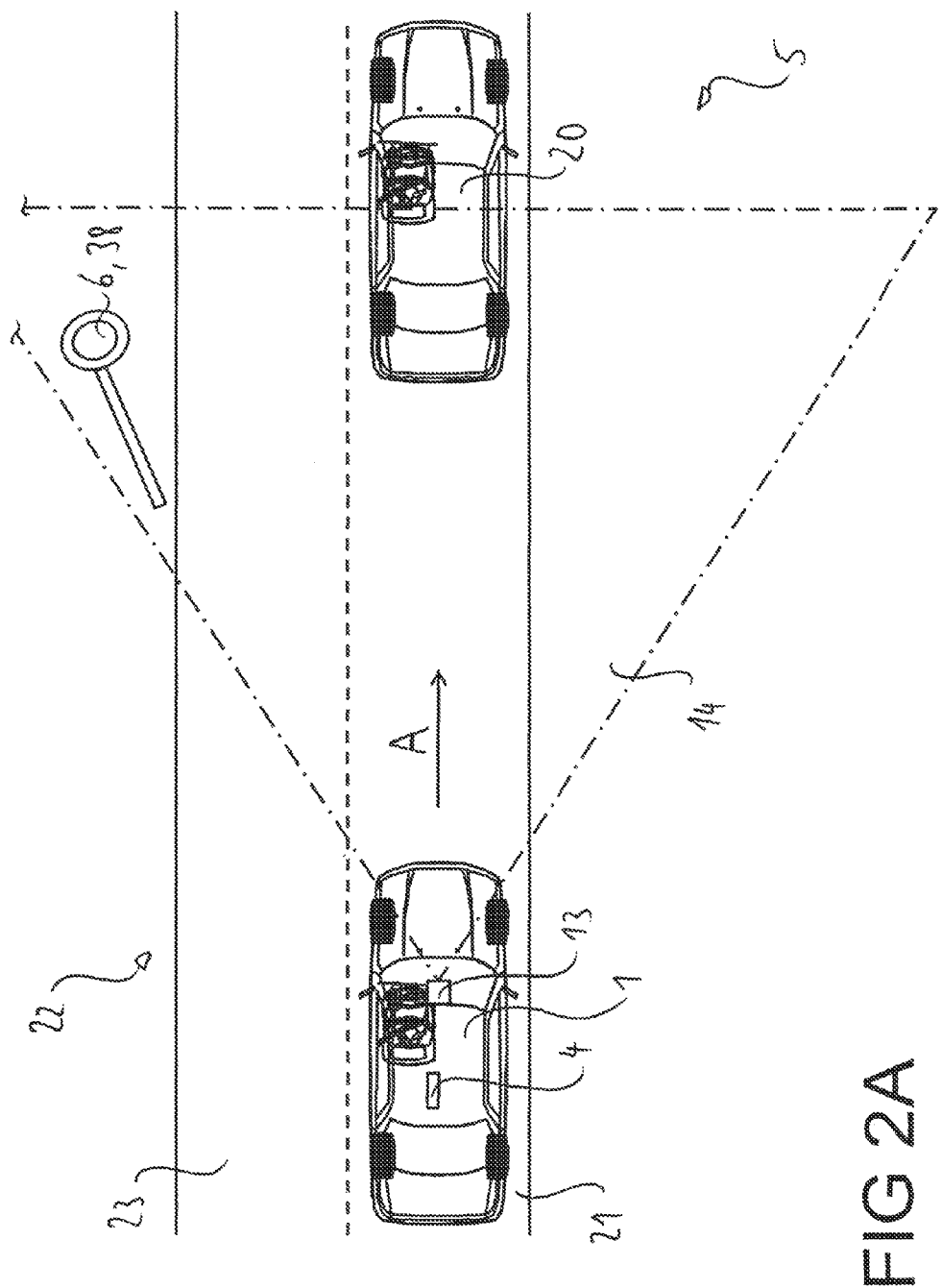
FIG. 2A shows an example of a traffic situation, in which the methods according to the application can be employed.

FIG. 2A shows an example of a traffic situation, in which the methods according to the embodiments of the present disclosure, in particular the method according to the embodiment shown in FIG. 1 can be employed. In the shown traffic situation, a motor vehicle 1 in the form of a passenger car travels in a travelling direction schematically shown by an arrow A travels on a first lane 21 of a road 22. In addition to the first lane 21, the road 22 additionally has a further lane 23.

The motor vehicle 1 includes at least one sensor 13, wherein the at least one sensor 13 in the shown situation is designed as an optical camera. The at least one sensors 13 in this case is designed for detecting objects within a detection range 14 schematically represented by a dash-dotted line. The at least one sensor 13 can be selected in a further configuration of the group consisting of a radar sensor, a lidar sensor and an ultrasound sensor.

In the shown traffic situation, a further motor vehicle 20 in the form of a passenger motor vehicle travels on the first lane 21 in front of the motor vehicle 1 in travelling direction of the motor vehicle 1. The further motor vehicle 20 in this case is located at least partially within the detection range 14 of the at least one sensor 13. In addition, a further object 6 is located within the detection range 14. The object 6 in the shown situation is a traffic sign 38 in form of a traffic sign board, which for example indicates a figure of a speed restriction.

Here, the traffic sign 38 forms a stationary object, whereas the motor vehicle 20 constitutes a moving object. As will be explained in more detail in connection with the following figures, a current position of the motor vehicle 1 can be determined by a position determining device of the motor vehicle 1 which is not shown in more detail in FIG. 2 and by a communication device 4 of the motor vehicle 1 a data set of map data which is stored in a vehicle-external device not shown in more detail in FIG. 2A, wherein the access data set contains map data of at least one part region of a surroundings 5 containing the determined current position of the motor vehicle 1. By a classification device of the motor vehicle 1 which is likewise not shown in more detail in FIG. 2A, the objects contained in the map data of the accessed data set can be classified according to stationary objects and moveable objects and the data contained in the map data of the accessed data set regarding objects classified stationary be transmitted to at least one interface of the motor vehicle 1 and following this a comparison with data, which were determined by the at least one sensor 13, can take place.

Figure 2B:
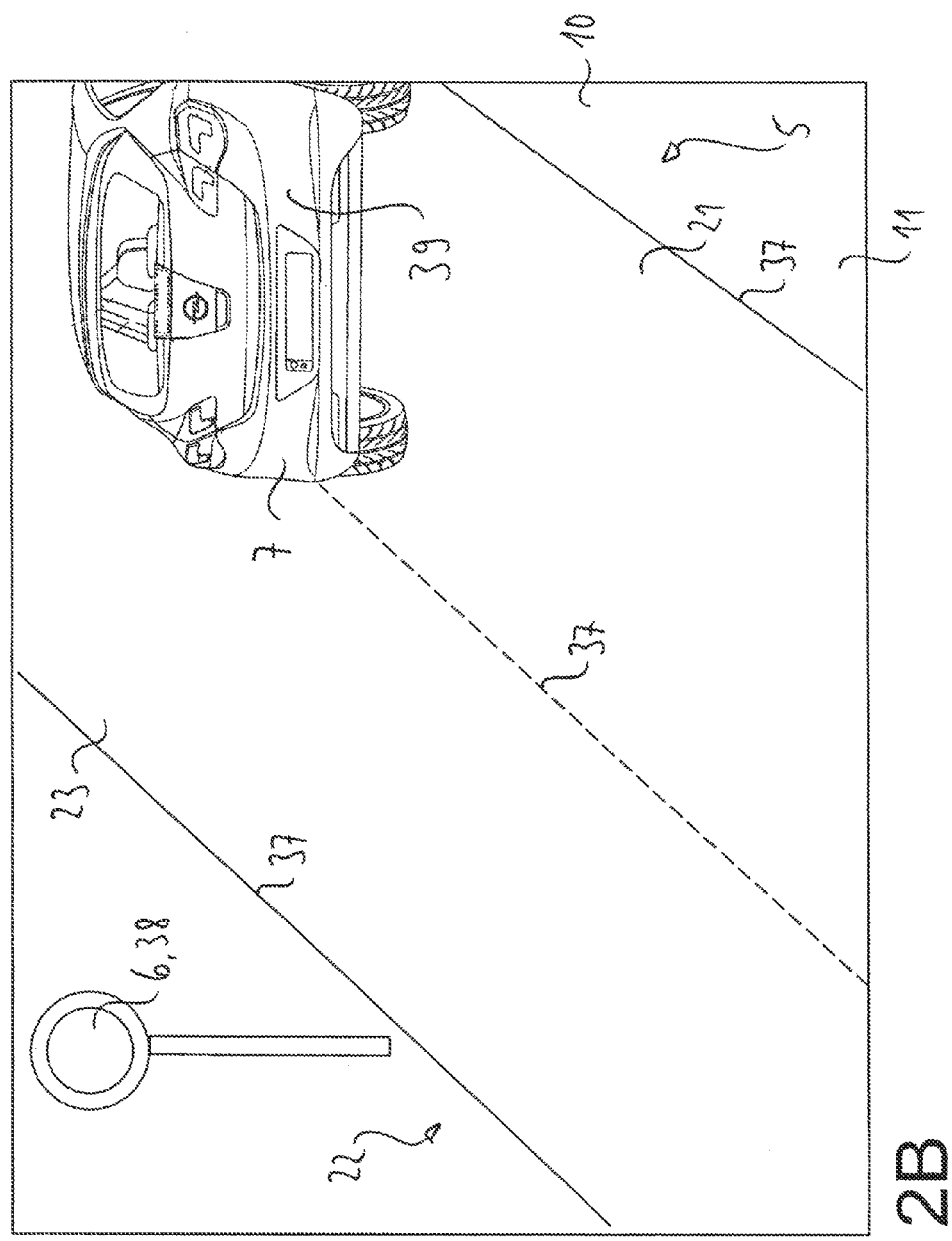
FIG. 2B shows map data of a part region of current surroundings of the motor vehicle shown in FIG. 2A.

To this end, FIG. 2B shows map data 10 accessed by the communication device, which contains at least a part region of the surroundings 5 containing the determined current position of the motor vehicle 1 shown in FIG. 2A. Components with the same functions as in FIG. 2A are marked with the same reference characters and are not explained again in the following. The map data 10 in the shown representation is image data 11, which contains images taken by at least one optical camera. The image data 11 in this case contains a part region of the lanes 21 and 23 of the road 22. In addition, the image data 11 contains the object 6 in the form of the traffic sign 38. Furthermore, the image data 11 contains a further object 7 in the form of a motor vehicle 39 travelling on the first lane 21 of the road 22 at the time the images are taken.

As already explained, the objects contained in the map data 10 of the accessed data set, in particular the objects 6 and 7, can be classified according to stationary objects and moveable objects and the data contained in the map data 10 of the accessed data set regarding the objects classified stationary be transmitted to at least one interface of the motor vehicle 1 shown in FIG. 2A. In the shown image data 11, the traffic sign 38 can thus be classified as stationary object 6 and the motor vehicle 39 as moveable object 7. Furthermore, the road markings 37 of the road 22 or the lanes 21 and 23 of the road 22 can be classified as stationary objects.

In addition, data contained in the map data 10 of the access data set, which for example concern the value of a speed description indicated on the traffic sign 38, can be determined by an image evaluation and for example transmitted to a driver assistance system of the motor vehicle 1.

Figure 3:
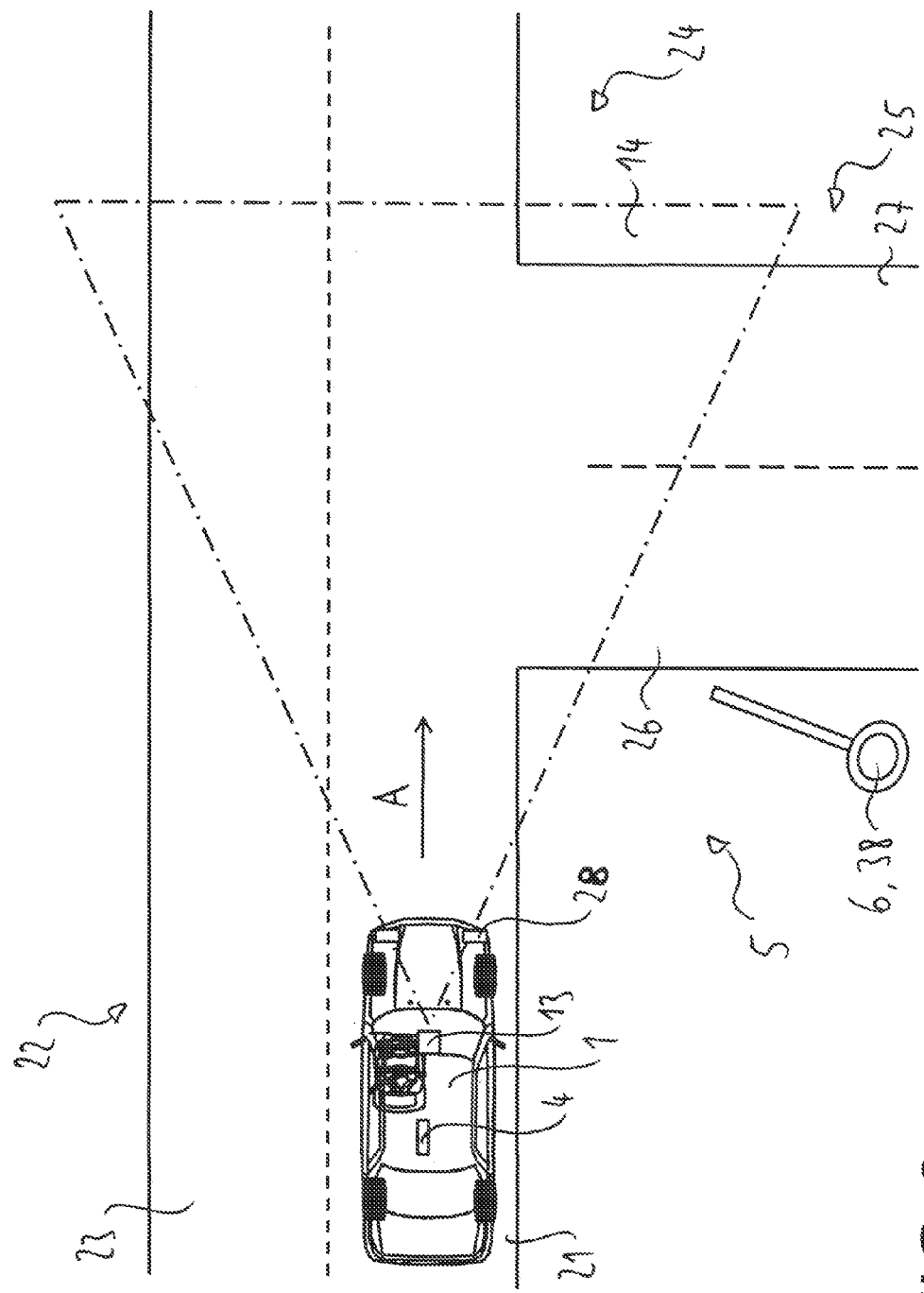
FIG. 3 shows an example of a further traffic situation, in which the methods according to the application can be employed.

FIG. 3 shows an example of a further traffic situation, in which the methods according to the embodiments of the present disclosure, in particular the method according to the embodiment shown in FIG. 1, can be employed. Components with the same functions as in the FIGS. 2A and 2B are marked with the same reference characters and are not explained again in the following.

In the traffic situation shown in FIG. 3, the motor vehicle 1 again travels on the first lane 21 of the road 22 in the travelling direction schematically shown by an arrow A. In travelling direction of the motor vehicle 1, an intersection 24 is located in front of said motor vehicle 1, in which a road 25 including lanes 26 and 27 joins the road 22.

In the shown traffic situation, the driver of the motor vehicle 1 intends changing from the first lane 21 of the road 22 to the lane 26 of the road 25 and signals this by actuating a corresponding direction indicator 28 of the motor vehicle 1. Objects, which are located outside the detection range 24 of the at least one sensor 13 of the motor vehicle 1 on the lane 26 of the road 25 in this case cannot be detected by the at least one sensor 13 and utilized for further data processing. In this situation, accessing a data set of map data stored in at least one vehicle-external storage device by the communication device 4 of the motor vehicle 1 can thus take place in such a manner that the accessed data set contains map data of at least one part region of surroundings 5 at least partially containing the road 25. By doing so, an object 6 in the form of a traffic sign 38 for example contained in the map data can be classified as stationary object and the data contained in the map data of the accessed data set regarding the object 6 classified stationary be transmitted to at least one interface of the motor vehicle 1, even before the object 6 is detected by the at least one sensor 13 of the motor vehicle 1.

Figure 4:
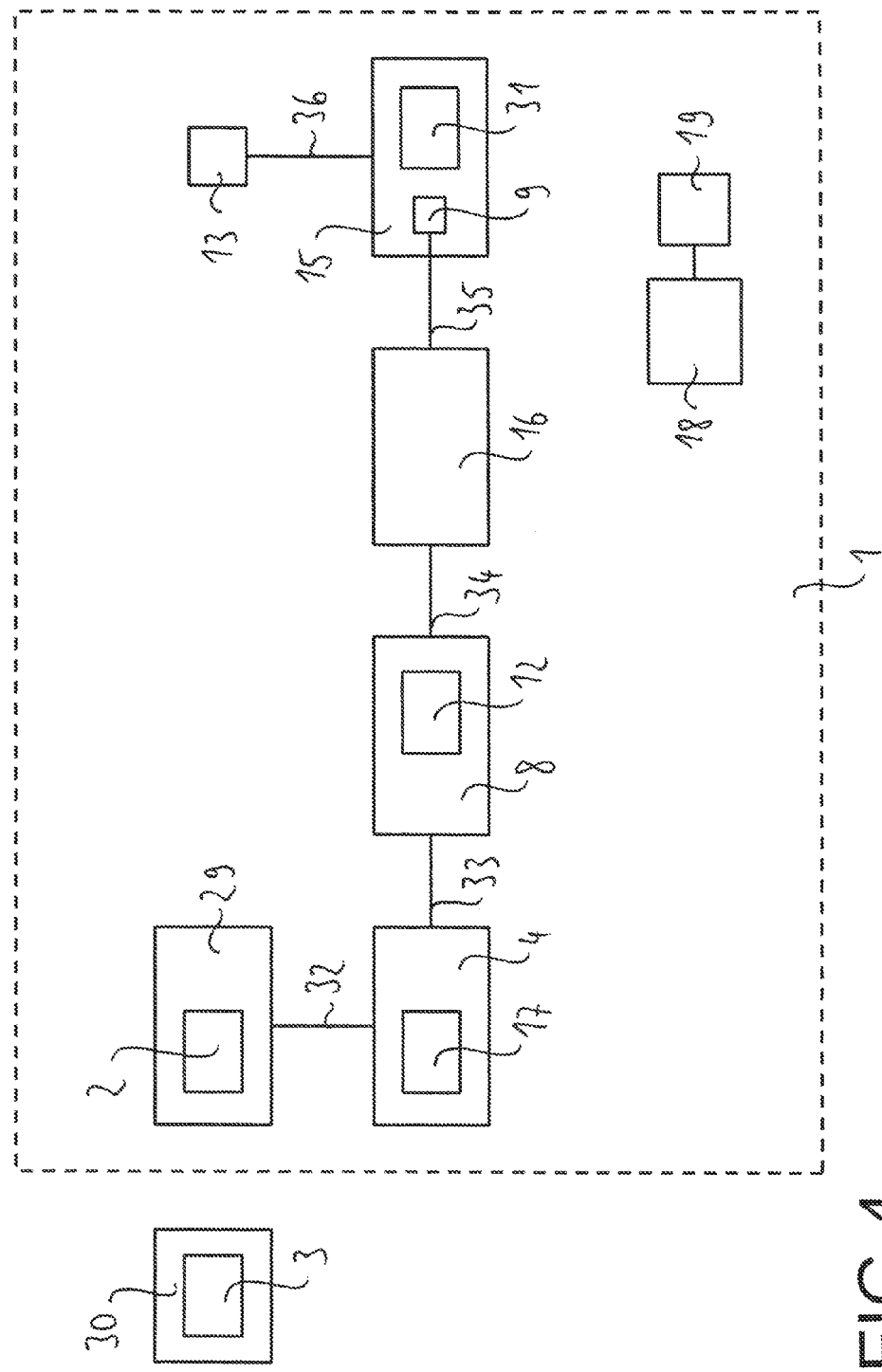
FIG. 4 shows a motor vehicle according to an embodiment of the present disclosure.

FIG. 4 shows the motor vehicle 1 shown in the FIGS. 2A and 3 according to an embodiment of the present disclosure. Components with the same functions as in the preceding figures are marked with the same reference characters and are not explained again in the following. For the sake of clarity, the motor vehicle 1 is merely schematically shown in FIG. 4. The motor vehicle 1 in the shown embodiment includes a position determining device 2, which is designed for determining a current position of the motor vehicle 1. The position determining device 2 in the shown embodiment is part of a navigation system 29 of the motor vehicle 1.

In addition, the motor vehicle 1 includes a communication device 4 which is designed for accessing a data set of map data stored in a schematically shown vehicle-external storage device 3 in such a manner that the accessed data set contains map data of at least a part region of surroundings containing the determined current position of the motor vehicle 1. The vehicle-external storage device 3 in this case is part for example of a server 30. The communication device 4 in this case is connected via a signal line 32 to the navigation system 29 containing the position determining device 2 and in the shown embodiment contains a mobile radio communication device 17, with the help of which the map data stored in the vehicle-external storage device 3 can be accessed from the server 30. To this end, the mobile radio communication device 17 transmits a corresponding query to the server 30 via a base station, which is not shown in more detail in FIG. 4, which contains the determined current position of the motor vehicle 1.

Furthermore, the motor vehicle 1 includes a classification device 8, which is designed for classifying objects contained in the map data of the access data set according to stationary objects and moveable objects. The classification device 8 to this end is connected via a signal line 33 to the communication device 4 and in the shown embodiment includes an image evaluation unit 12, which is designed for classifying the objects contained in the map data of the accessed data set by image evaluation of image data contained in the map data of the accessed data set.

Furthermore, the motor vehicle 1 includes a transmission device 16, which is designed for transmitting data contained in the map data of the accessed data set regarding objects classified stationary to at least one interface 9 of the motor vehicle 1. The interface 9 in the shown embodiment is part of at least one driver assistance system 15 of the motor vehicle 1. The transmission device 16 to this end is connected via a signal line 34 to the classification device 8 and via a signal line 35 to the interface 9.

The driver assistance system 15 is designed for example as a traffic sign detection system or as a lane-keeping system and connected via a signal line 36 to the at least one sensor 13 of the motor vehicle 1. Furthermore, the driver assistance system 15 in the shown embodiment includes a unit 31, wherein the unit 31 is designed for determining a current position of the object classified stationary relative to the motor vehicle 1 based on the current position of the motor vehicle 1 determined by the position determining device 2 and position data of the objects classified stationary contained in the map data. In addition, the unit 31 is designed for determining a current position of objects detected by the at least one sensor 13 relative to the motor vehicle 1, based on data determined by the at least one sensor 13. In addition to this, the unit 31 is designed for comparing the current positions of the objects determined by the at least one sensor 13 with the current positions of the objects classified stationary determined based on the position data contained in the map data.

Furthermore, the motor vehicle 1 in the shown embodiment includes a computer unit 18 and a computer-readable medium 19, wherein on the computer-readable medium 19 a computer program product is stored which, when it is executed on the computer unit 18, instructs the computer unit 18 to carry out the steps mentioned in connection with the embodiments of the method, in particular the steps of the embodiment shown in FIG. 1, by the elements mentioned there. To this end, the computer unit 18 is connected directly or indirectly to the relevant elements in a manner that is not shown in more detail.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for operating a motor vehicle, wherein the method comprises:
    determining a current position of a motor vehicle with a position determining device arranged in the motor vehicle;
    accessing a vehicle-external storage device stored external to the motor vehicle to obtain an accessed data set by the communication device arranged in the motor vehicle, wherein the accessed data set includes map data for at least one region of surroundings with respect to the determined current position of the motor vehicle having at least one object therein, wherein the accessed data set further includes high-resolution image data for the at least one region of surroundings;
    processing the high-resolution image data to:
        classify the at least one object as a stationary objects or as a moveable object by a classification device arranged in the motor vehicle;
        filter objects classified as moveable objects; and
        determine a position of objects classified as stationary objects; and
    determining a relative position of the motor vehicle, based on the determined position of objects classified as stationary objects.

2. The method according to claim 1 wherein the method further comprises transmitting data contained in the accessed data set regarding the at least one objects classified as a stationary object to at least one interface of the motor vehicle.

3. The method according to claim 2, wherein the accessed data set contains the high-resolution image data of an image taken by at least one optical camera, and wherein classifying the at least one object contained in the accessed data set includes an image evaluation of the image data by an image evaluation unit arranged in the motor vehicle.

4. The method according to claim 2, wherein the method further comprises determining a probable travel route of the motor vehicle, wherein accessing the vehicle-external storage device takes place such that the accessed data set contains map data for at least one region of the probable travel route of the motor vehicle.

5. The method according to claim 2, wherein the method further comprises transmitting data contained in the accessed data set includes transmitting a position data of the at least one object classified as a stationary object when the data contained in the accessed data set includes the position data of at least one object classified as a stationary object.

6. The method according to claim 5, wherein the method further comprises determining a current position of the at least one object relative to the motor vehicle based on the determined current position of the motor vehicle and the position data of the at least one object classified as a stationary object.

7. The method according to claim 6, wherein the method further comprises:
    detecting an object within a predetermined detection range with at least one sensor arranged in the motor vehicle; and
    determining a current position of the detected object relative to the motor vehicle based on data determined by the at least one sensor.

8. The method according to claim 7, wherein the method further comprises comparing the current position of the detected object with the current position of the object classified stationary as a stationary object based on the position data contained in the accessed data set.

9. The method according to claim 2, wherein the method further comprises transmitting the data contained in the accessed data set regarding the at least one objects classified as a stationary object to at least one driver assistance system of the motor vehicle.

10. A motor vehicle comprising:
    a position determining device configured to determine a current position of the motor vehicle;
    a communication device configured to access a data set of map data stored external to the motor vehicle to obtain an accessed data set, wherein the accessed data set includes map data for at least one region of surroundings with respect to the determined current position of the motor vehicle having at least one object therein, wherein the accessed data set further includes high-resolution image data for the at least one region of surroundings;
    a classification device comprising at least an image evaluation unit, the classification device configured to process the high-resolution image data to:
        classify the at least one object contained in the accessed data set as a stationary object or a moveable object;
        filter objects classified as movable objects; and
        determine a position of objects classified as stationary objects; and
    wherein the position determining device is further configured to determine a relative position of the motor vehicle, based on the determined position of objects classified as stationary objects.

11. The motor vehicle according to claim 10 further comprising a transmission device configured to transmit data contained in the accessed data set regarding the at least one object classified as a stationary object to at least one interface of the motor vehicle.

12. The motor vehicle according to claim 11, wherein the at least one communication device comprises a mobile radio communication device.

13. The motor vehicle according to claim 11, wherein the transmission device is configured to transmit the data contained in the accessed data set regarding the at least one object classified as a stationary object stationary to at least one driver assistance system of the motor vehicle.

14. A non-transitory computer-readable medium storing a computer program product which, when it is executed on a computer of a motor vehicle instructs the computer to carry out a process comprising:
    determining a current position of a motor vehicle with a position determining device arranged in the motor vehicle;
    accessing, using a mobile radio communication device operating according to Long Term Evolution (LTE) communication standard, a vehicle-external storage device stored external to the motor vehicle to obtain an accessed data set by a communication device arranged in the motor vehicle, wherein the accessed data set includes map data for at least one region of surroundings with respect to the determined current position of the motor vehicle having at least one object therein, and wherein the accessed data set further includes high-resolution image data for the at least one region of surroundings;

processing the high-resolution image data to:
- classify the at least one object as a stationary objects or as a moveable object by a classification device arranged in the motor vehicle;
- filter objects classified as movable objects;
- determine a position of objects classified as stationary objects; and
- determine a relative position of the motor vehicle, based on the determined position of objects classified as stationary objects; and transmitting data contained in the accessed data set regarding the at least one objects classified as a stationary object to at least one interface of the motor vehicle.

* * * * *